United States Patent
Steenbakkers-Menting et al.

(10) Patent No.: US 11,306,197 B2
(45) Date of Patent: *Apr. 19, 2022

(54) POLYPROPYLENE COMPOSITION FOR NON-PRESSURIZED PIPES

(71) Applicant: SABIC GLOBAL TECHNOLOGIES B.V., Bergen op Zoom (NL)

(72) Inventors: Henrica Norberta Alberta Maria Steenbakkers-Menting, Geleen (NL); Patrick Elisabeth Luc Voets, Geleen (NL); Martin Alexander Zuideveld, Kelmis (BE); Akhlaq A. Moman, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 116 days.

This patent is subject to a terminal disclaimer.

(21) Appl. No.: 16/956,187

(22) PCT Filed: Dec. 18, 2018

(86) PCT No.: PCT/EP2018/085643
§ 371 (c)(1),
(2) Date: Jun. 19, 2020

(87) PCT Pub. No.: WO2019/121777
PCT Pub. Date: Jun. 27, 2019

(65) Prior Publication Data
US 2020/0332102 A1 Oct. 22, 2020

(30) Foreign Application Priority Data
Dec. 22, 2017 (EP) .......... 17210345

(51) Int. Cl.
*C08L 23/12* (2006.01)
*C08F 10/06* (2006.01)
*C08F 110/06* (2006.01)

(52) U.S. Cl.
CPC .......... *C08L 23/12* (2013.01); *C08F 110/06* (2013.01); *C08L 2203/18* (2013.01); *C08L 2314/02* (2013.01)

(58) Field of Classification Search
None
See application file for complete search history.

(56) References Cited

U.S. PATENT DOCUMENTS

| 4,866,022 A | 9/1989 | Arzoumanidis et al. |
| 6,723,795 B1 | 4/2004 | Dupire et al. |
| 9,605,093 B2 * | 3/2017 | Ishiwata ............ C08K 5/13 |
| 2016/0046737 A1 * | 2/2016 | Miller McLoughlin ........ C08F 10/06 526/348 |
| 2021/0070970 A1 | 3/2021 | Voets et al. |

FOREIGN PATENT DOCUMENTS

| EP | 3127945 A1 | 2/2017 |
| JP | 2004002655 A | 1/2004 |
| WO | 2010037747 A1 | 4/2010 |
| WO | 2018059955 A1 | 4/2018 |

OTHER PUBLICATIONS

International Serach Report for International Application No. PCT/EP2018/085643, International Filing Date Dec. 18, 2018, dated Feb. 1, 2019, 5 pages.
Written Opinion for International Application No. PCT/EP2018/085643, International Filing Date Dec. 18, 2018, dated Feb. 1, 2019, 5 pages.
Maddah, "Polypropylene as a Promising Plastic: A Review," Am. J. Polym. Sci. 2016, 6(1):1-11. (Year: 2016).

* cited by examiner

*Primary Examiner* — Richard A Huhn
(74) *Attorney, Agent, or Firm* — Cantor Colburn LLP

(57) ABSTRACT

The invention relates to a polypropylene composition comprising a propylene homopolymer or propylene-ethylene copolymer having an ethylene content of at most (1.0) wt % based on the propylene-ethylene copolymer, wherein the amount of propylene homopolymer or propylene-ethylene copolymer is at least (98) wt %, for example at least (98.5) wt %, preferably at least (99) wt %, more preferably at least (99.5), for example at least (99.75) wt % based on the polypropylene composition, wherein the polypropylene composition has a melt flow rate in the range of (0.10) to less than (0.70) dg/min as measured according to ISO1133 (2.16 kg/230° C.), an Mw/Mn in the range from (7.0) to (13.0), wherein Mw stands for the weight average molecular weight and Mn stands for the number average weight, an Mz/Mn is in the range from (20) to (50), wherein Mz stands for the z-average molecular weight and wherein Mw, Mn and Mz are measured according to ASTM (D6474-12).

15 Claims, No Drawings

POLYPROPYLENE COMPOSITION FOR NON-PRESSURIZED PIPES

CROSS REFERENCE TO RELATED APPLICATIONS

This application is a National Stage application of PCT/EP2018/085643, filed Dec. 18, 2018, which claims the benefit of European Application No. 17210345.9, filed Dec. 22, 2017, both of which are incorporated by reference in their entirety herein.

The invention relates to a polypropylene composition comprising a propylene homopolymer or propylene-ethylene copolymer, an article comprising said polypropylene composition, preferably a pipe as well as to a process for producing a pipe from the polypropylene composition of the invention and to the use of the polypropylene composition of the invention for producing a pipe.

Polypropylene-based polymers have many characteristics which make them suitable for many applications as for instance pipes, like sewage pipes.

In general, polypropylene-based materials to be chosen for pipe applications should result in products of high impact performance as well as of good stiffness. However these properties are interrelated to each other and very often behave in a conflicting manner, meaning improving one of the properties can up to now only be accomplished on the expense of the other property.

The market for pipes suitable for non-pressure pipe applications, for example sewage pipe systems, seeks for materials enabling the manufacture of pipes with high ring stiffness. For such applications, stiffness levels of the materials are required of more than 1800 MPa. For even more demanding applications, stiffness levels of more than 1900 MPa, or even more than 2000 MPa may be required.

WO2010/037747A1 discloses a polypropylene composition comprising
(a) a propylene homopolymer (A) comprising, at least 97 wt.-% propylene units, (b) a platelet-like inorganic filler (B), and
(c) a β-nucleating agent (C), wherein the propylene composition and/or the propylene homopolymer (A) (i) has (have) a polydispersity index (PI) of at least 4.0, and (ii) is(are) partially β-nucleated as determined by DSC run according to ISO 3146/part 3/method C2 using second heat scan.

A drawback of this composition is that it requires the use of special fillers (the platelet-like inorganic filler and a β-nucleating agent. At the same time, from a commercial perspective, there is a continuous desire to increase the production speed.

Therefore, it is an object of the invention to provide a polypropylene composition having an improved stiffness and a better processability without the necessity to use special fillers and/or β-nucleating agents.

This object is achieved by a polypropylene composition comprising a propylene homopolymer or propylene-ethylene copolymer having an ethylene content of at most 1.0 wt % based on the propylene-ethylene copolymer
wherein the amount of propylene homopolymer or propylene-ethylene copolymer is at least 98 wt %, for example at least 98.5 wt %, preferably at least 99 wt %, more preferably at least 99.5 wt %, for example at least 99.75 wt % based on the polypropylene composition wherein the polypropylene composition has a melt flow rate in the range of 0.10 to less than 0.70 dg/min as measured according to ISO1133 (2.16 kg/230° C.)

an Mw/Mn in the range from 7.0 to 13.0, wherein Mw stands for the weight average molecular weight and Mn stands for the number average weight an Mz/Mn is in the range from 20 to 50, wherein Mz stands for the z-average molecular weight
and wherein Mw, Mn and Mz are measured according to ASTM D6474-12.

It has been found that the polypropylene compositions of the invention show a high stiffness and maintain their impact strength, which allows for the preparation of pipes with a high stiffness, and may also increase the ring stiffness. A higher ring stiffness means that the pipe will show less deformation (into an oval shape) when a load is applied on the top. This is highly advantageous for sewage pipes for non-pressurized applications, as they may be located under the ground and should be able to withstand pressures on the outside of the pipe, such as the pressure from the ground or from traffic above. Therefore, it may be possible to prepare pipes having the same dimensions, but having a higher stiffness (less deformation). Surprisingly, in order to achieve such high stiffness and good processability in pipe extrusion using the polypropylene compositions of the invention, there is no need to use a special filler and/or a β-nucleating agent.

Alternatively, a high ring stiffness may make it possible to produce pipes having the same outer diameter, but with a lower wall thickness. Down gauging (saving of a material) is desired from an environmental, as well as from a cost perspective. In addition, the inner diameter may be increased while maintaining the outer dimensions and the required ring stiffness. Furthermore, pipes having thinner walls can also be produced faster, since they need less time for cooling.

For the purpose of the invention, ring stiffness is determined using ISO 9969:2016: (Thermoplastic pipes—determination of ring stiffness).

In addition, the pipes prepared from the composition of the invention may be extruded at higher speeds, which means that the pipes can be produced at a higher throughput and/or by using less energy, which is advantageous from both an environmental as well as from a cost perspective.

In addition, the pipes comprising the composition of the invention may be able to reach at least 1000 hours when tested under the conditions of DIN-EN1451 1999 (Plastics piping systems for soil and waste discharge (low and high temperature) within the building structure—polypropylene (PP), which is a test used as a quality requirement for (sewage) pipes.

The polypropylene composition of the invention has a melt flow rate in the range of 0.10 to less than 0.70 dg/min, preferably a melt flow rate of at least 0.15 dg/min, preferably of at least 0.20, more preferably of at least 0.24 and/or of preferably at most 0.50 as measured according to ISO1133 (2.16 kg/230° C.). Preferably, the polypropylene composition of the invention has a melt flow rate in the range of 0.20 to 0.50 dg/min as measured according to ISO1133 (2.16 kg/230° C.).

The ethylene content in the propylene-ethylene copolymer is relatively low, i.e. at most 1.0 wt % based on the propylene-ethylene copolymer. For example the ethylene content is at least 0.1 wt %, for example at least 0.2 wt %, for example at least 0.3 wt %, for example at least 0.4 wt %, for example at least 0.5 wt % and/or for example at most 1.0 wt %, for example at most 0.7 wt % based on the propylene-ethylene copolymer. Within the framework of the invention, with propylene-ethylene copolymer is meant a random propylene-ethylene copolymer.

It is preferred that the polypropylene composition of the invention has an average molecular weight Mw of at least 400 kmol, preferably at least 450 kmol and/or preferably of at most 600 kmol.

In order to have a good high speed processing behavior in extrusion, it is preferred that the polypropylene composition of the invention has a molecular weight distribution (MWD) of at least 7.0, for example at least 8.0, preferably at least 8.5, more preferably at least 9.0 and/or at most 13.0, for example at most 12.0, preferably at most 11.0, more preferably at most 10.0. Preferably, the polypropylene composition of the invention according to the invention has a molecular weight distribution in the range from 8.0 to 11.0, wherein MWD is calculated by dividing the weight average molecular weight (Mw) by the number average molecular weight (Mn) and wherein Mw and Mn are measured according to ASTM D6474-12.

The Mz/Mn is calculated by dividing the z-average molecular weight (Mz) by the numbe average molecular weight (Mn) and wherein Mz and Mn are measured according to ASTM D6474-12.

The polypropylene composition has an XS in the range from 0.5 to 3.5 wt %, preferably in the range from 0.5 to 3.0 wt %, more preferably in the range from 0.1 to 2.5 wt % based on the polypropylene composition. XS stands for the amount of xylene solubles which are measured according to ASTM D 5492-10.

It is preferred that the polypropylene composition has a pentad isotacticity of at least 94%, preferably of at least 94.5% and preferably of at most 98% based on the polypropylene composition, wherein the pentad isotacticity is determined using $^{13}C$ NMR.

Additionally it is appreciated that the polypropylene composition is not chemically modified as it is known for instance from high melt strength polymers (HMS-polymer). Thus the polypropylene composition is not cross-linked. A parameter of the degree of branching is the branching index g'. The branching index g' correlates with the amount of branches of a polymer. The branching index g' is defined as $g'=[IV]_{br}/[IV]_{lin}$, in which g' is the branching index, $[IV]_{br}$ is the intrinsic viscosity of the branched polypropylene and [IV]lin is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the polypropylene composition shall be at least 0.85, more preferably at least 0.90, yet more preferably at least 0.95, like 1.00.

Preferably, the polypropylene composition of the invention is unimodal. Unimodality of the polypropylene composition may further improve the processing of the polypropylene composition and/or may further decrease the gelcount.

It is herein understood that the term 'unimodal' means a polypropylene composition which is unimodal with respect to molecular weight distribution, whereby preferably the propylene homopolymer or propylene-ethylene copolymer can be polymerised in a single stage batch or preferably a single reactor in a continuous process. The polymerization can be a slurry or gas phase, preferably a gas phase polymerization.

The polypropylene composition of the invention may further comprise additives. Preferably, the propylene composition of the invention does not comprise polymers other than the propylene homopolymer or the propylene-ethylene copolymer. Preferably, the sum of the amount of additives and the amount of propylene homopolymer or propylene-ethylene copolymer is 100 wt % based on the polypropylene composition.

In a preferred embodiment, the polypropylene composition of the invention does not comprise a n-nucleating agent.

Preferably, the polypropylene composition of the invention has a flexural modulus in parallel orientation of at least 1800 MPa, preferably at least 1850 MPa, more preferably at least 1900 MPa as measured according to ASTM D790-10.

Preferably, the Mz/Mw, that is the z-average molecular weight divided by the Mw, that is the average molecular weight is in the range from 2.7 to 4.5.

Preferably, the polypropylene composition of the invention has an Izod notched impact strength in parallel orientation of at least 2.5, preferably at least 3.0 kJ/m$^2$, more preferably at least 4.0 kJ/m$^2$ as measured at 23° C. according to ISO 180 4A, Test geometry: 65*2.7*3.2 mm, notch 45° according to ISO 37/2 parallel orientation.

In another aspect, the invention relates to a pipe comprising the polypropylene composition of the invention, more preferably to a pipe comprising at least 90 wt %, for example at least 95 wt %, for example at least 99 wt % of the polypropylene composition based on the pipe, more preferably to a pipe consisting of the polypropylene composition of the invention.

In another aspect, the invention relates to the use of the polypropylene composition of the invention for the preparation of pipes.

In another aspect, the invention relates to a process for the preparation of the pipe of the invention, comprising the step of providing the polypropylene composition of the invention.

Specifications for sewage pipes of external diameters from 32 to 315 mm are for example given in DIN-EN1451 1999 (Plastics piping systems for soil and waste discharge (low and high temperature) within the building structure—polypropylene (PP)). The external diameters of sewage pipes are for example in the range from 30 to 350 mm.

Examples of pipes of the invention include but are not limited to pipes suitable for non-pressure pipe applications, for example for outdoor use, for above as well as underground drainage and sewage pipe systems, surface water pipes, pipes for cable protection, and for indoor use, soil and waste water pipes.

The person skilled in the art is aware of how to operate a pipe extrusion process. For example, the pipe of the invention may be produced by first melting the polypropylene composition of the instant invention in an extruder at temperatures in the range of from 200 to 300° C. and then extruding it through an annular die and cooling it.

The extruders for producing the pipe can for example be single screw extruders with an L/D of 20 to 40 or twin screw extruders or extruder cascades of homogenizing extruders (single screw or twin screw). Optionally, a melt pump and/or a static mixer can be used additionally between the extruder and the ring die head. Depending on the desired size of the pipe, ring shaped dies with diameters ranging from approximately 16 to 2000 mm and even greater are possible.

For example, the melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet. After leaving the annular die, the pipe is taken off over a calibrating mandrel, usually accompanied by cooling of the pipe by air cooling and/or water cooling, optionally also with inner water cooling.

The person skilled in the art is aware how to prepare a propylene homopolymer or propylene-ethylene copolymer. The preparation of propylene homopolymers and propylene-ethylene copolymers is for example described in Moore, E. P. (1996) Polypropylene Handbook. Polymerization, Characterization, Properties, Processing, Applications, Hanser Publishers: New York.

Polypropylene homopolymers and propylene-ethylene copolymers can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

In another aspect, the invention relates to a process for the preparation of the polypropylene composition of the invention, comprising the step of polymerizing propylene and optional ethylene comonomers in the presence of a catalyst to obtain the propylene homopolymer or the propylene-ethylene copolymer, wherein said catalyst is obtainable by a process comprising the steps of A) providing a Ziegler-Natta procatalyst, wherein step (A) of providing the Ziegler-Natta procatalyst comprises the steps of contacting a magnesium-containing support with
  i) a halogen-containing titanium compound,
  ii) ethylbenzoate as an activator,
  iii) and as internal donor an aminobenzoate compound according to formula B:

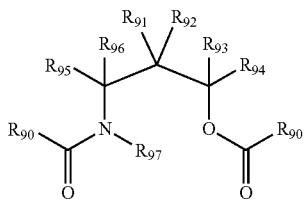

wherein each $R^{90}$ group is independently a substituted or unsubstituted aromatic group; $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is a nitrogen atom; 0 is an oxygen atom; and C is a carbon atom; preferably 4-[benzoyl(methyl)amino]pentan-2-yl benzoate (AB); and B) contacting said Ziegler-Natta procatalyst obtained in step A) with a co-catalyst and at least one external electron donor to obtain said catalyst;
preferably wherein step A) to provide the Ziegler-Natta procatalyst comprises the following steps:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being $0<z<2$, x is in a range of larger than 0 and smaller than 2, being $0<x<2$;
  ii) optionally contacting the solid $Mg(OR^1)_x X^1_{2-x}$ obtained in step ii) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$ and is either 3 or 4; $w<v$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms;
  iii) contacting the first or second intermediate reaction product, obtained respectively in step i) or ii), with the halogen-containing Ti-compound; the activator; and the internal electron donor to obtain said Ziegler-Natta procatalyst;

Preferably in said process, as external donor in step B) a phthalate free donor, for example di(isopropyl) dimethoxysilane, is used.

In case a phthalate-free catalyst, such as the above described catalyst using a phthalate free external donor, is used, the polypropylene composition of the invention is essentially phthalate-free.

This has the advantage that undesired phthalates (in for example a sewage pipe) will not end up in the environment. For water purification plants, this may mean that less (difficult) purification of the water is needed.

Therefore, preferably, the polypropylene composition of the invention as well as any articles comprising such polypropylene composition, such as the pipes of the invention are essentially phthalate-free.

For purposes of the invention, essentially phthalate-free is defined as the presence of less than 0.0001 wt % of phthalates based on the polypropylene composition, preferably 0.00000 wt % of phthalates based on the polypropylene composition.

In another aspect, the invention relates to a polypropylene composition obtained or obtainable by the process of the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Example 1

Step A) Butyl Grignard Formation

A 1.7 L stirred flask, fitted with a reflux condenser and a funnel, was filled with magnesium powder (40.0 g, 1.65 mol). The flask was brought under nitrogen. The magnesium was dried at 80° C. for 2 hours under nitrogen purge, after which dibutyl ether (200 ml), iodine (0.05 g) and n-chlorobutane (10 ml) were successively added and stirred at 120 rpm. The temperature was maintained at 80° C. and a mixture of n-chlorobutane (146 ml) and dibutyl ether (1180 ml) was slowly added over 3 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 0.90 mol Mg/L was obtained.

Step B) Preparation of the First Intermediate Reaction Product

The solution of reaction product of step A (500 ml, 0.45 mol Mg) and 260 ml of a solution of tetraethoxysilane (TES) in dibutyl ether (DBE), (47 ml of TES and 213 ml of DBE), were cooled to 5° C., and then were fed simultaneously to a mixing device (minimixer) of 0.45 ml volume equipped with a stirrer and jacket. The minimixer was cooled to 5° C. by means of cold water circulating in the minimixer's jacket. The stirring speed in the minimixer was 1000 rpm. From the mixing device, the mixed components were directly dosed into a 1.3 liter reactor fitted with blade stirrer and containing 350 ml of dibutyl ether. The dosing temperature of the reactor was 35° C. and the dosing time was 360 min. The stirring speed in the reactor was 250 rpm at the beginning of dosing and was gradually increased up to 450 rpm at the end of dosing stage. On completion of the dosing, the reaction mixture was heated up to 60° C. in 30 minutes and held at this temperature for 1 hour. Then the stirring was stopped and the solid substance was allowed to settle. The supernatant was removed by decanting. The solid substance was washed three times using with 700 ml of heptane at a reactor temperature of 50° C. for three times. A pale yellow solid substance, reaction product B (the solid first intermediate reaction product; the support), was obtained upon drying with a nitrogen purge. The average particle size of support was 20 microns.

Step C) Preparation of the Second Intermediate Reaction Product

In inert nitrogen atmosphere at 20° C. in a 1000 ml glass flask equipped with a mechanical agitator was filled with 50 g of reaction product B, dispersed in 500 ml of heptane and stirred at 250 rpm. Subsequently, a solution of 2.7 ml ethanol (EtOH/Mg=0.1) in 20 ml heptane was dosed under stirring during 1 hour. After keeping the reaction mixture at 20° C. for 30 minutes, a solution of 9.5 ml titanium tetraethoxide (TET/Mg=0.1) in 20 ml of heptane was added for 1 hour. The slurry was slowly allowed to warm up to 30° C. over 30 minutes and held at that temperature for another 2 hours. Finally, the supernatant liquid was decanted from the solid reaction product (the second intermediate reaction product C; first activated support) which was washed once with 500 ml of heptane at 30° C. and dried using a nitrogen purge.

Step D) Preparation of the Third Intermediate Reaction Product

In inert nitrogen atmosphere at 25° C. in a 1000 ml glass flask equipped with a mechanical agitator was filled with 50 g of second intermediate reaction product C dispersed in 500 ml of heptane and stirred at 250 rpm. Subsequently, a solution of 6.3 ml ethanol (EtOH/Mg=0.3), 20.8 ml of toluene and 37.5 ml of heptane was dosed at 25° C. under stirring during 1 hour. The slurry was slowly allowed to warm up to 30° C. over 30 minutes and held at that temperature for another 3 hours. Finally, the supernatant liquid was decanted from the solid reaction product (the third intermediate reaction product D; second activated support) which was washed once with 500 ml of heptane at 25° C. and dried using a nitrogen purge.

Preparation of the Catalyst H

Steps A-D) are carried out as in Example 1. Step E) is carried out as follows.

A 300 ml reactor-filter flask was brought under nitrogen and 125 mL of titanium tetrachloride was added, then 5.5 g of second activated support in 15 ml of heptane was added to the reactor. The contents of the reactor were stirred for 60 minutes at room 25° C. Then, 1.78 ml of ethylbenzoate, EB (EB/Mg=0.30 molar ratio) in 4 ml of chlorobenzene was added to the reactor in 30 minutes. Temperature of reaction mixture was increased to 115° C. and then the reaction mixture was stirred at 115° C. for 90 minutes (I stage of catalyst preparation). The contents of the flask were filtered, after which the solid product was washed with chlorobenzene (125 ml) at 100 to 105° C. for 20 minutes. Then, the contents of the flask were filtered. A mixture of titanium tetrachloride (62.5 ml) and chlorobenzene (62.5 ml) was added to the reactor. The reaction mixture was stirred at 115° C. for 60 minutes (II stage of catalyst preparation). Then, the contents of the flask were filtered. A mixture of titanium tetrachloride (62.5 ml) and chlorobenzene (62.5 ml) was added to the reactor. Then, 0.51 g of 4-[benzoyl(methyl) amino]pentan-yl benzoate (AB/Mg=0.04) in 4 ml of chlorobenzene was added to the reactor in 10 minutes. The reaction mixture was stirred at 115° C. for 30 minutes (III stage of catalyst preparation). Then, the contents of the flask were filtered. A mixture of titanium tetrachloride (62.5 ml) and chlorobenzene (62.5 ml) was added to the reactor. The reaction mixture was stirred at 115° C. for 30 minutes (IV stage of catalyst preparation). Then, the contents of the flask were filtered. The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid catalyst H produced is given in Table 1.

TABLE 1

Composition of solid catalyst H

| Catalyst | Example | d50 [μm] | Mg [%] | Ti [%] | ID [%] | Activator (EB) [%] | EtO [%] |
|---|---|---|---|---|---|---|---|
| H | 8 | 22.16 | 19.65 | 2.40 | 8.41 | 6.68 | 1.48 |

Catalyst CE

Catalyst CE is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_n SiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

The process was performed in one horizontally stirred gas-phase reactor with downstream powder processing units (=degassing & catalyst deactivation) for powder collection.

The reactor was operated at an average of 70° C. at 25 bar. H2/C3 ratios in both reactors were controlled such to obtain a powder having the desired melt flow rate (MFR).

The catalyst was dosed through a nozzle to the reactor. Cocatalyst (triethylaluminium, TEN) and External Donor (DIPDMS or DiBDMS) were dosed via a separate nozzle to the reactor (as a premixed mixture) and in ratio to the catalyst flow.

The process conditions as given in Table 2 were used:

TABLE 2

Process conditions.

| | catalyst | donor | Al/Mg (mol/mol) | Al/Si (mol/mol) | Si/Ti (mol/mol) | $H_2/C_3$ (mol/mol) |
|---|---|---|---|---|---|---|
| Example 1 | H | DiPDMS | 4 | 7 | 7.8 | 0.056 |
| Comparative example 1 (CE1) | CE | DiBDMS | 4 | 14 | 3.9 | 0.0003 |

DiPDMS: di-(isopropyl)-dimethoxysilane
DiBDMS: di(isobutyl)-dimethoxysilane

The powder was collected and granulate was prepared by melt-mixing the powder with the appropriate additives in a single screw extruder. The additives (antioxidants, acid scavengers) were used in an amount of 1400 ppm based on the powder and mixed prior to dosing to the extruder. The temperature profile in the extruder was 20-20-30-50-100-170-220-220-240° C., at a throughput of 13 kg/h at 200 rpm.

Preparation of the Pipe

A pipe with a diameter of 32 mm a 3.0 mm thickness was prepared by extrusion in a Reifenhauser S50 I with a barrier screw operated at 35 rpm. The die head temperature profile was set to 40/190/200/205/205° C. and temperature profile of the extruder was set to 205/205/205/205° C. The extruded pipes were cooled to a temperature of 20° C. The pressure sensor to measure the 'melt pressure' (indicated in the table below) was located in between the extruder and the die head.

Methods

All of the below properties were measured on the granulate.

Mz, Mn, Mw

Mw, Mn and Mz were all measured in accordance with ASTM D6474-12 (Standard Test Method for Determining Molecular Weight Distribution and Molecular Weight Averages of Polyolefins by High Temperature Gel Permeation Chromatography). Mw stands for the weight average molecular weight and Mn stands for the number average weight. Mz stands for the z-average molecular weight.

In addition to the method specified by ASTM D6474-12, the method was performed using a configuration in which a Polymer Char 1R5 infrared concentration detector and a Polymer Char online viscosity detector was used to gain 'absolute' or accurate molar masses. Three columns of Polymer Laboratories 13 μm PLgel Olexis, 300×7.5 mm were used in series with 1,2,4-trichlorobenzene stabilized with 1 g/L butylhydroxytoluene (also known as 2,6-di-tert-butyl-4-methylphenol or BHT) as eluens. The molar mass was determined based on a calibration using linear PE standards (narrow and broad (Mw/Mn=4 to 15)) in the range of 0.5-2800 kg/mol. Samples of polymer granules were mixed with Tris (2,4-di-tert-butylphenyl)phosphite (Irgafos 168) and 1,1,3-Tris (2-methyl-4-hydroxy-5-tert-butylphenyl)butane (Topanol CA) in a weight ratio sample: Irgafos: Topanol of 1:1:1, after which the mixture thus obtained was dissolved in 1,2,4-trichlorobenzene stabilized with 1 g/L BHT until the concentration of the mixture in 1,2,3-trichlorobenzene stabilized with 1 g/L BHT was 0.03 wt %.

Xylene Solubles (XS)

XS, wt % is xylene solubles, measured according to ASTM D 5492-10. 1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes places with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

Pentad Isotacticity 175 mg of the polypropylene granules was dissolved in 3 ml at 130° C. in deuterated tetrachloroethylene ($C_2D_2Cl_4$) containing 2,6-Di-tert-butyl-4-methylphenol (BHT) (5 mg BHT in 200 ml $C_2D_2Cl_4$). The $^{13}C$ NMR spectrum was recorded on a Bruker Avance 500 spectrometer equipped with a cryogenically cooled probe head operating at 125° C.

The isotacticity of the mmmm pentad levels was determined from the $^{13}C$ NMR spectrum in % based on the total pentad amount.

Melt Flow Rate (MFR)

For purpose of the invention the melt flow rate is the melt flow rate as measured according to ISO1133 (2.16 kg/230° C.).

Tm and Tc Measurement

The crystallization temperature, the crystallinity and the melting temperature are measured according to ASTM D3418-08 at a heating rate of 10° C./min in DSC. The sample is heated up to 200° C. (first heating) and then cooled at a cooling rate 10° C./min of (to measure the crystallization temperature Tc) and then heated a second time at a heating rate of 10° C./min (second heating) to measure the melting temperature (Tm). For the determination of Tc and Tm, a 5 mg polymer sample was measured.

Flex. Modulus (Parallel Orientation).

For purpose of the present invention, stiffness of the granulate is determined by measuring the flexural modulus according to ASTM D790-10. Flexural modulus was determined on 3.2 mm thick specimens according to ISO37/2, parallel orientation.

Izod Notched Impact Strength (Parallel Orientation)

For purpose of the present invention, impact strength is determined by measuring the Izod notched impact strength of the granulate at 23° C. according to ISO 180 4A, Test geometry: 65*12.7*3.2 mm, notch 45° according to ISO 37/2 parallel orientation.

TABLE 3

Results

| example | IE1 | CE1 |
|---|---|---|
| Mw (kDa) | 600 | 560 |
| Mn (kDa) | 75 | 99 |
| Mz (kDa) | 1800 | 1400 |
| Mz/Mw | 2.9 | 2.5 |
| Mz/Mn | 24.0 | 14.1 |
| MWD = Mw/Mn | 9.3 | 5.7 |
| XS (wt %) | 2.6 | 2.9 |
| Pentad isotacticity (%) | 96.0 | 94.4 |
| Tm ($2^{nd}$ heating), (°C.) | 163.9 | 161.9 |
| Tc ($2^{nd}$ cooling), °C. | 114.1 | 114.3 |
| MFR (g/10 min) | 0.46 | 0.29 |
| properties | | |
| flex modulus (parallel orientation) (MPa) | 2002 | 1790 |
| Izod notched Impact strength (parallel orientation) (kJ/m$^2$) | 4.49 | 5.14 |
| Melt pressure (kPa/cm$^2$) | 109 | 134 |

CONCLUSION

As can be seen from Table 3, the polypropylene compositions of the invention show a have a higher stiffness and maintain their impact strength, which allows for the preparation of pipes with an increased stiffness and may for example increase ring stiffness.

In addition, the lower melt pressure indicates that the pipes may be extruded at higher speeds, which the pipes can be produced with a higher throughput. The lower melt pressure also indicates that the pipes may be produced using less energy.

In particular, when a phthalate free external donor is used (as in IE1 of the examples and not in CE1), this has the advantage that undesired phthalates (in for example a sewage pipe) will not end up in the environment. For water purification plants, this may mean that less (difficult) purification of the water is needed.

The invention claimed is:

1. Polypropylene composition comprising a propylene homopolymer or propylene-ethylene copolymer having an ethylene content of at most 1.0 wt % based on the propylene-ethylene copolymer,
   wherein the amount of propylene homopolymer or propylene-ethylene copolymer is at least 98 wt %, based on the polypropylene composition
   wherein the polypropylene composition has
      a melt flow rate in the range of 0.10 to less than 0.70 dg/min as measured according to ISO1133 (2.16 kg/230° C.);
      an Mw/Mn in the range from 7.0 to 13.0, wherein Mw stands for the weight average molecular weight and Mn stands for the number average weight; and
      an Mz/Mn is in the range from 20 to 50, wherein Mz stands for the z-average molecular weight; and
   wherein Mw, Mn and Mz are measured according to ASTM D6474-12.

2. Polypropylene composition according to claim 1 having a melt flow rate in the range of 0.20 to 0.50 dg/min, as measured according to ISO1133 (2.16 kg/230° C.).

3. Polypropylene composition according to claim 1, wherein the composition has an amount of xylene soluble amount (XS) as measured according to ASTM D 5492-10 in the range from 0.5 to 3.5 wt %.

4. Polypropylene composition according to claim 1, wherein the composition has a pentad isotacticity of at least 94% based on the composition, wherein the isotacticity is determined using $^{13}C$ NMR.

5. Polypropylene composition according to claim 1, wherein the composition is unimodal.

6. Polypropylene composition according to claim 1, further comprising additives, and wherein sum of the amount of additives and the amount of propylene homopolymer or propylene-ethylene copolymer is 100 wt % based on the polypropylene composition.

7. Polypropylene composition according to claim 1 having a flexural modulus in parallel orientation of at least 1800 MPa, as measured according to ASTM D790-10.

8. Polypropylene composition according to claim 1 having has an Izod notched impact strength in parallel orientation of at least 2.5, as measured at 23° C. according to ISO 180 4A.

9. Polypropylene composition according to claim 1, wherein the Mz/Mw of the polypropylene composition is in the range from 2.7 to 4.5.

10. Pipe comprising the polypropylene composition of claim 1.

11. Process for the preparation of the pipes of claim 10 comprising the step of providing the polypropylene composition.

12. Process for the preparation of the polypropylene composition of claim 1, comprising the step of:
   polymerizing propylene and optional ethylene comonomers in the presence of a catalyst, to obtain the propylene homopolymer or the propylene-ethylene copolymer, wherein said catalyst is obtainable by a process comprising the steps of A) providing a Ziegler-Natta procatalyst, wherein step (A) of providing the Ziegler-Natta procatalyst comprises the steps of contacting a magnesium-containing support with
  i) a halogen-containing titanium compound,
  ii) ethylbenzoate as an activator,
  iii) and as internal donor an aminobenzoate compound according to formula B:

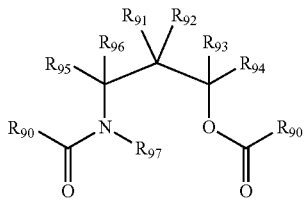

wherein each $R^{90}$ group is independently a substituted or unsubstituted aromatic group; $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof; N is a nitrogen atom; O is an oxygen atom; and C is a carbon atom; and B) contacting said Ziegler-Natta procatalyst obtained in step A) with a co-catalyst and at least one external electron donor to obtain said catalyst.

13. Process according to claim 12, wherein as external donor in step B) a phthalate free donor is used.

14. Process according to claim 11, wherein step A) to provide the Ziegler-Natta procatalyst comprises the following steps:

i) contacting a compound $R^4{}_z MgX^4{}_{2-z}$ with an alkoxy- or aryloxy-containing silane compound to give a first intermediate reaction product, being a solid $Mg(OR^1)_x X^1{}_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being $0<z<2$, x is in a range of larger than 0 and smaller than 2, being $0<x<2$;

ii) optionally contacting the solid $Mg(OR^1)_x X^1{}_{2-x}$ obtained in step ii) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$ and is either 3 or 4; $w<v$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; and iii) contacting the first or second intermediate reaction product, obtained respectively in step i) or ii), with the halogen-containing Ti-compound; the activator; and the internal electron donor to obtain said Ziegler-Natta procatalyst.

15. Process according to claim 13, wherein the external donor in step B) comprises di(isopropyl) dimethoxysilane.

* * * * *